L. A. KRAMER.
HOG DEHAIRING AND SCRAPING MACHINE.
APPLICATION FILED MAY 19, 1917.
1,249,776.
Patented Dec. 11, 1917.
5 SHEETS—SHEET 1.
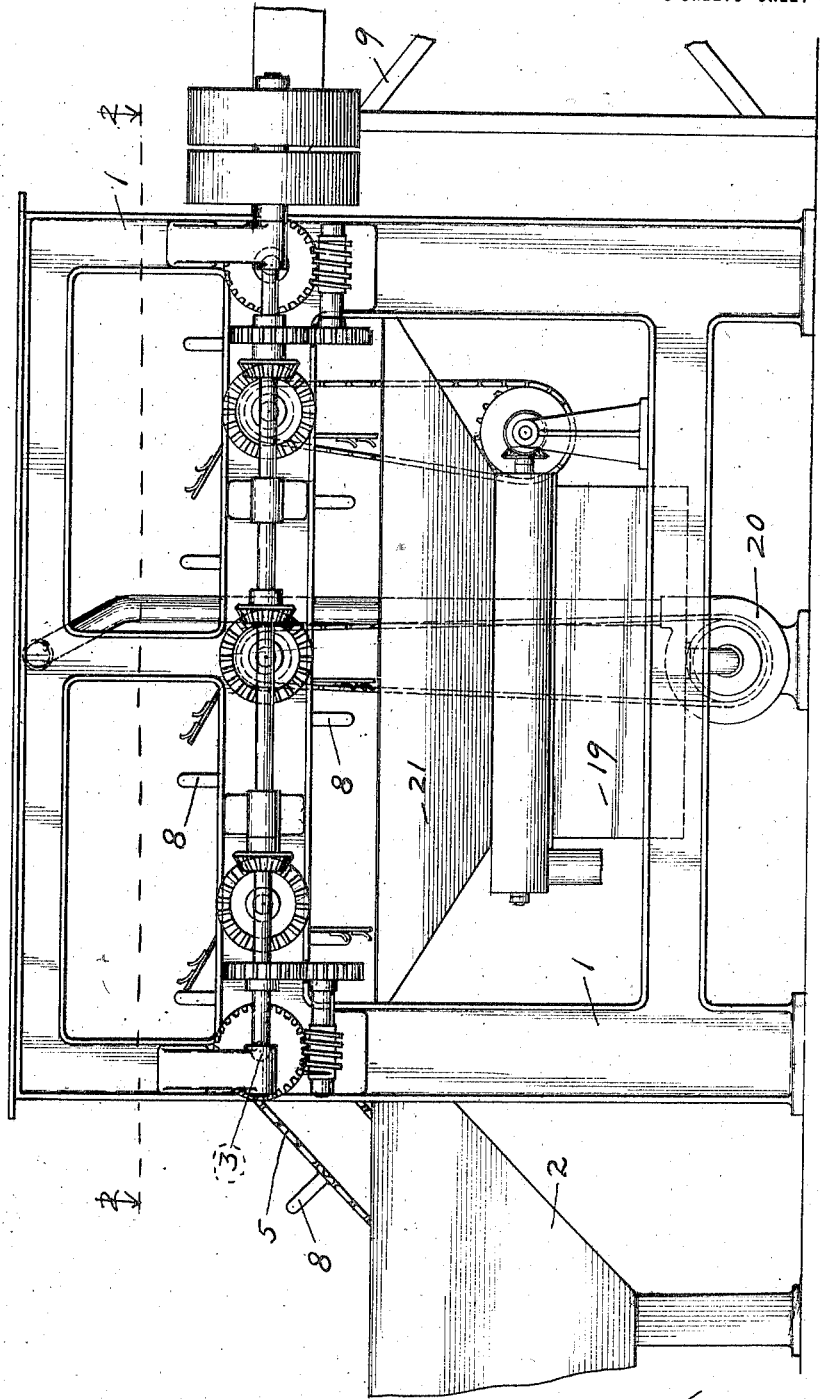
Inventor: Louis A. Kramer

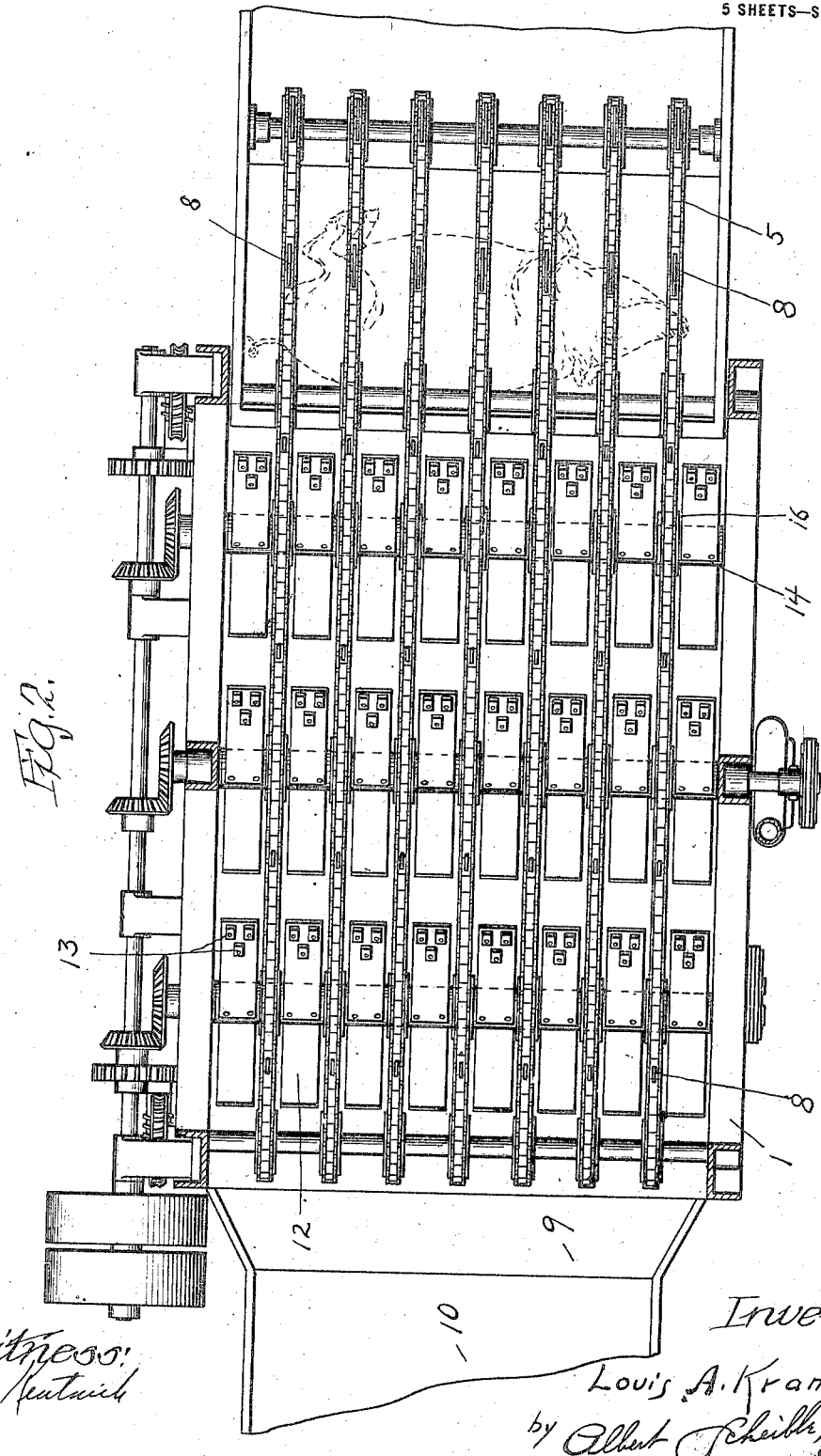

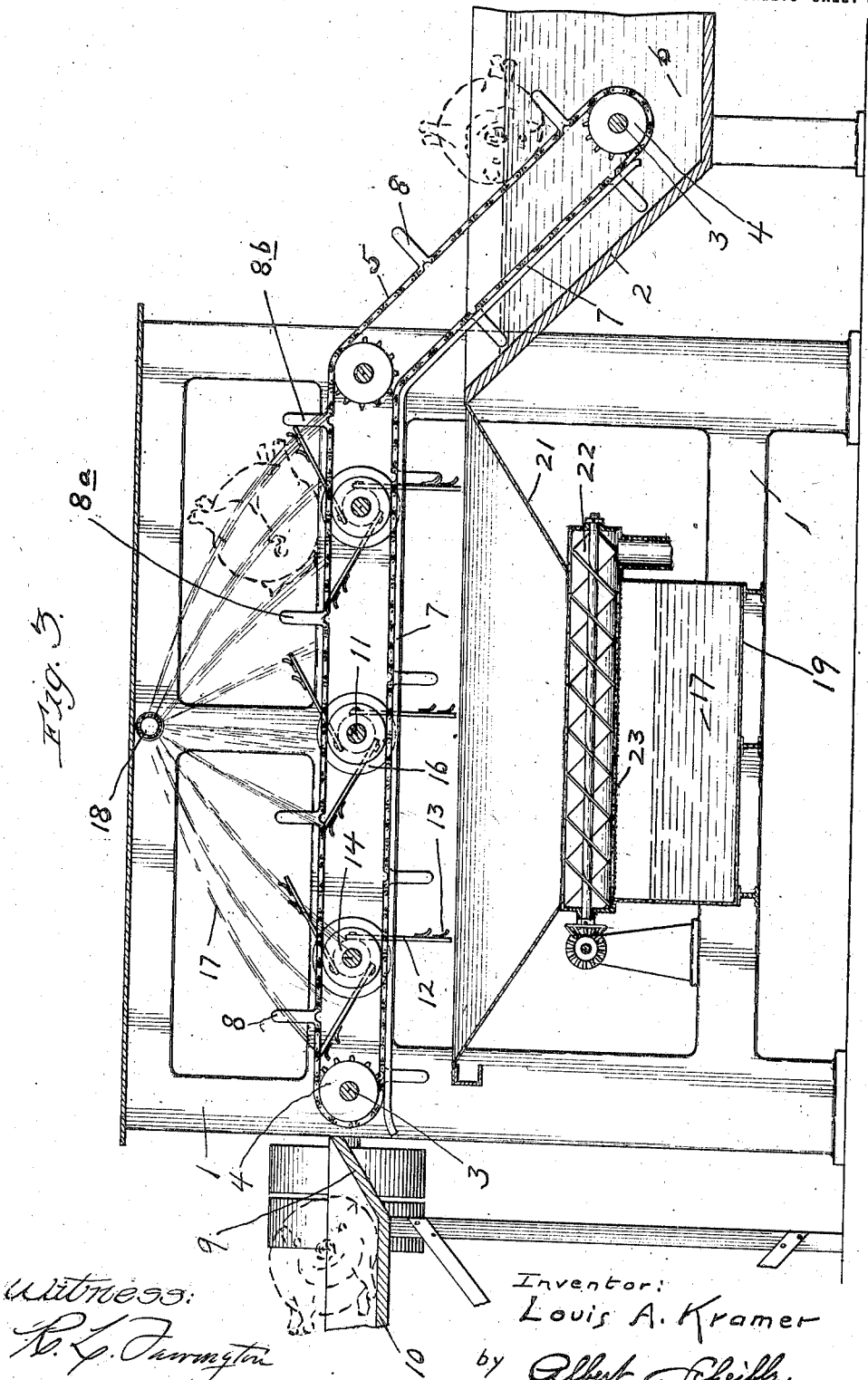

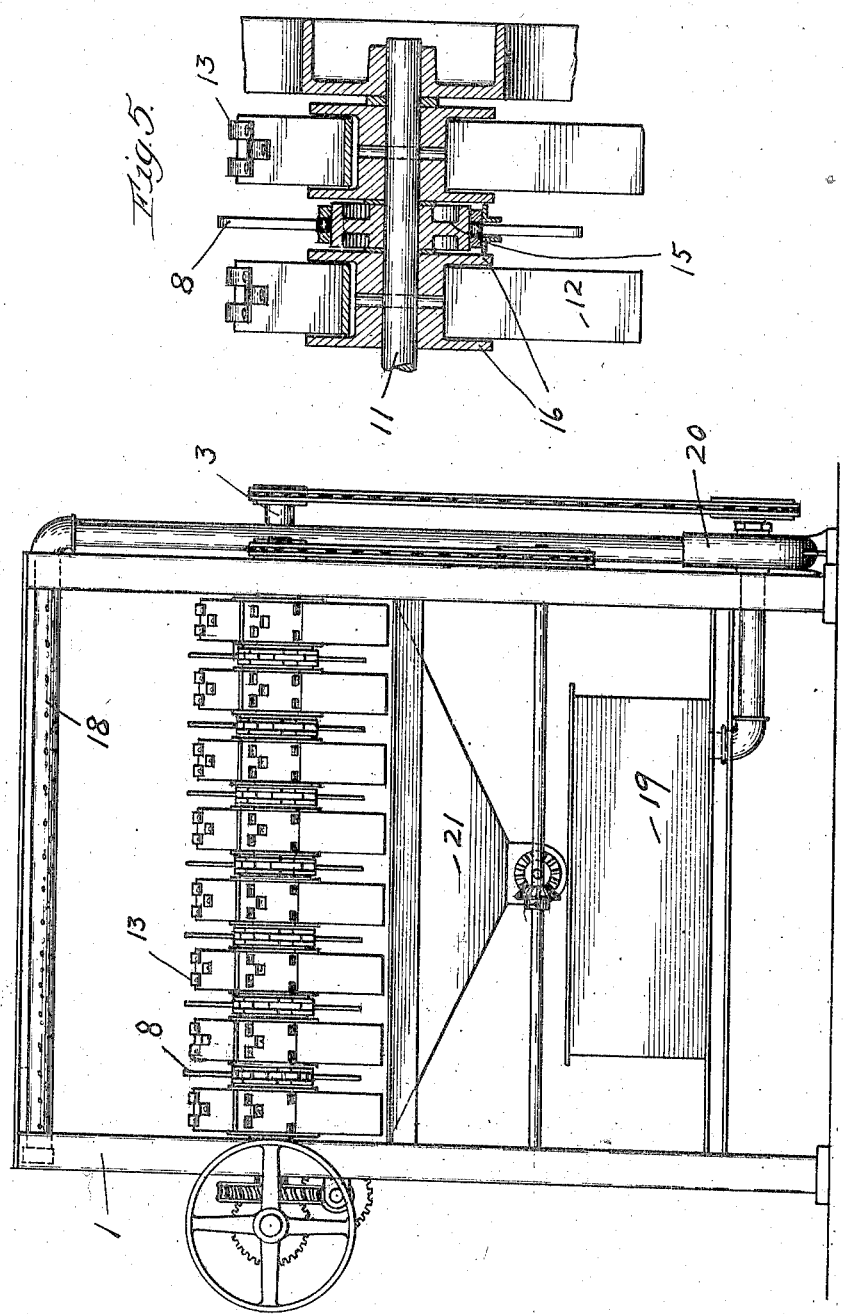

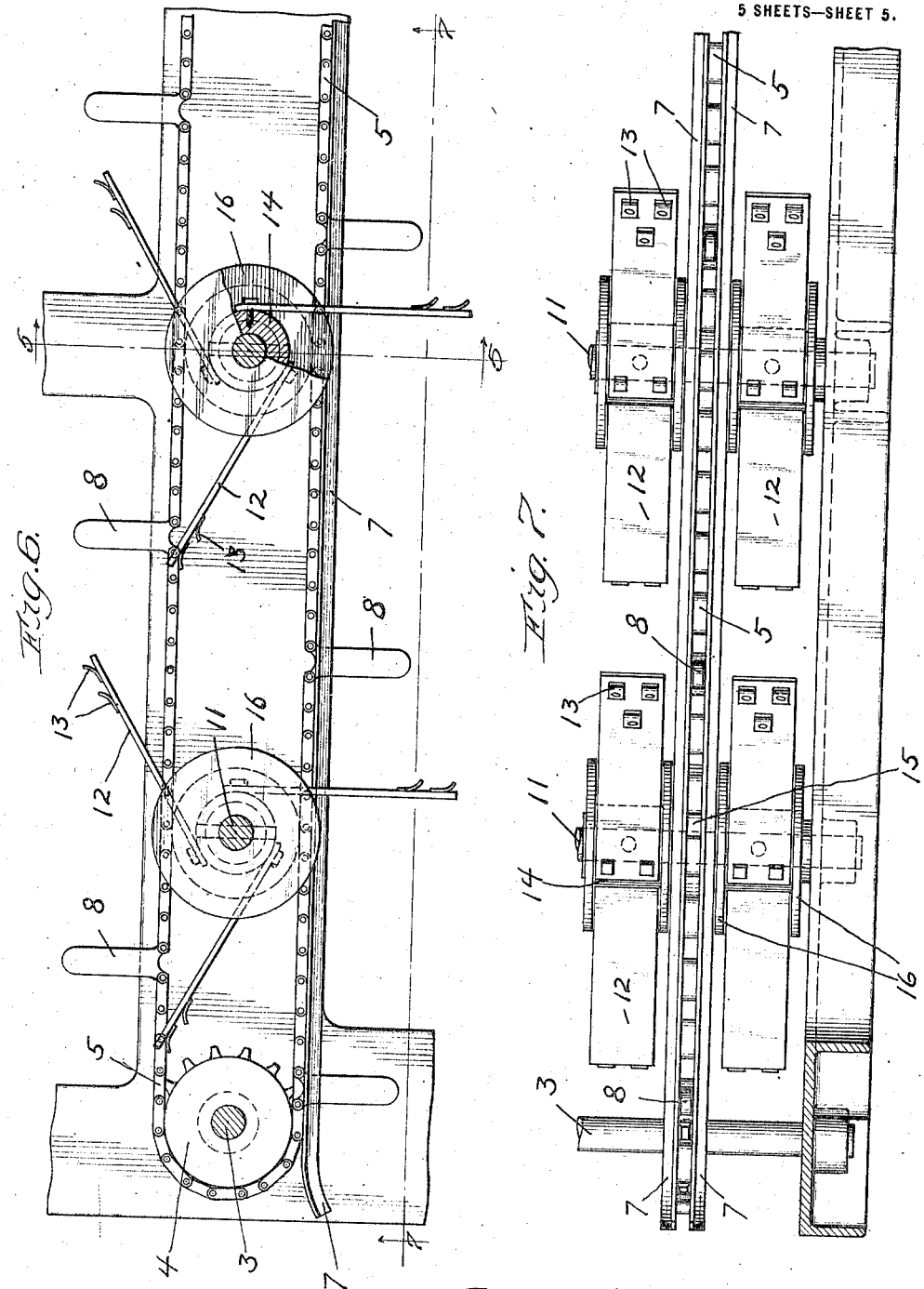

UNITED STATES PATENT OFFICE.

LOUIS A. KRAMER, OF CHICAGO, ILLINOIS.

HOG DEHAIRING AND SCRAPING MACHINE.

1,249,776.

Specification of Letters Patent.  Patented Dec. 11, 1917.

Application filed May 19, 1917.  Serial No. 169,655.

*To all whom it may concern:*

Be it known that I, LOUIS A. KRAMER, a citizen of the United States, residing at Chicago, in the county of Cook and State of Illinois, have invented certain new and useful Improvements in Hog Dehairing and Scraping Machines; and I do hereby declare the following to be a full, clear, and exact description of the invention, such as will enable others skilled in the art to which it appertains to make and use the same.

My invention relates to carcass-dehairing and polishing machines of the general class commonly used for scraping and polishing hogs, and of the class employing impact beaters for the dehairing. In the machines heretofore constructed for this purpose, it has been customary either to drag the hog through the machine with a chain or the like attached to the hog by means of a hook or shackle, or to feed the hog through the machine without positively gripping it. With the former method, an extra man is required at the scalding tub to affix the hook or shackle to the hog, and if the animal is hooked in the jaw, the tongue is apt to be damaged and liable to be rejected by the Government inspector, thereby causing a considerable loss. Likewise, the foot gripped or hooked by the drag means is apt to be damaged and rejected as inedible, and in any case, the transfer of the hook or other gripping means from one animal to another is directly contrary to the tendencies of modern sanitation. On the other hand, if the scraping machine is so constructed as to feed the hog through it by gravity, the rate of travel will depend on the weight of the hog; hence, a heavy hog may pass entirely through the machine before it is properly dehaired, while a light hog will waste both time and power in being subjected to a needlessly long treatment by the dehairing beaters. Moreover, an effective dehairing can only be obtained by turning and shifting the hog so as successively to expose all surface portions to the scrapers. Where the hog is hooked, special means must be provided for rotating it. On the other hand, if the beaters alone are expected to rotate the hog, their effect in this respect will vary considerably with the size and weight of the hog. Consequently, the scraping or dehairing machines heretofore on the market have been irregular in the results produced by the same and, to a large extent, have required an excessive number of attendants for a rather moderate output, besides requiring auxiliary mechanisms for delivering the hogs to and from the machines.

The general object of my invention includes the surmounting of these objections, particularly by providing a machine which will automatically take the hog right from the scalding tub without hooking or in any way injuring it, which will feed the hog through the machine positively and in a predetermined time, and which will provide for an effective rotating of the hog while the latter is being scraped. More particularly, my invention aims to provide means for permitting a limited movement of the hog during the scraping without altering the rate at which it passes through the machine, to utilize the beaters for rotating the hog and also to provide auxiliary means for effecting such rotation, to provide auxiliary supporting means for the conveyer elements so as to overcome an excessive sagging of the latter when handling heavy hogs, and to provide simple coöperative means for actuating the conveying, beating and rotating mechanism. Still other, as well as more detailed, objects will appear from the following illustrations which together disclose a desirable embodiment of my invention, though by no means the one to which my invention should be limited.

In the drawings, Figure 1 is a rear elevation of my dehairing machine, with a portion of the scalding trough cut away.

Fig. 2 is a horizontal section through the machine along the line 2—2 of Fig. 1.

Fig. 3 is a longitudinal and vertical section through the machine along the line 3—3 of Fig. 2.

Fig. 4 is an end elevation of the machine, taken from the right hand end of Fig. 1.

Fig. 5 is an enlarged fragmentary vertical section through a pair of beaters and the parts adjacent thereto.

Fig. 6 is an enlarged fragmentary vertical section taken longitudinally of the machine along the line 6—6 of Fig. 2.

Fig. 7 is a bottom plan view of the same parts.

In the embodiment of the drawings, my invention consists essentially of a frame 1 and a scalding trough 2 supporting drive shafts 3, each of which shafts carries a plurality of spaced sprockets 4. The sprockets on the respective shafts are alined in rows extending longitudinally of the machine, and the sprockets on each shaft are intermeshed with conveyer chains 5 dipping into the water 6 within the trough 2 and guided on their lower stretch by guides 7. Each of the said chains carries a series of projecting arms 8, spaced by a distance corresponding roughly to the extreme diameter of the largest hog which the machine is expected to handle. Each such arm reaches out sufficiently far to engage a hog in the scalding trough when the hog is floated up against the chain as shown in Fig. 3, so that the continuous movement of the chain will carry the hog through the frame of the machine and drop it upon a chute 9 leading to the delivery board 10 as shown at the left of the machine in Fig. 3.

Mounted on shafts 11 also extending transversely of the frame of the machine are impact members, each of which as here shown consists of three flexible beaters 12 fitted respectively near their outer ends with a number of metal scrapers 13 and attached at their inner ends to collars 14. These beater shafts 11 also desirably carry auxiliary or idler sprockets 15 for supporting the upper stretches of the chains 5 and these sprockets are preferably spaced from the beaters by flanges 16 of such diameter as to project upward beyond the tops of the chains and of the beater collars 14. With the parts thus arranged, it will be obvious from Fig. 3 that a hog floated up to the chain will be carried up on the incline of the conveyer and through the machine past the successive shafts 3. As soon as the hog comes within range of the tips of the beaters, which are carried by rapidly rotating shafts, the metal scrapers on these beaters will begin to dehair the hog and at the same time will tend to rotate the hog. More particularly, the beaters shown at the right hand end of the machine in Fig. 3 will at first tend to slide the hog on the chains toward the left and against the arms or stops 8ᵃ; then, when the hog is approximately over the beater shaft, the beaters will tend to raise the hog off the chains, thereby enabling the rotating effect of the impact of the beaters to turn the hog more freely; and finally, will give taps of increasing gentleness to the hog as the latter moves out of range of the beaters and rolls against the arms 8ᵇ. Thus, the lifting action of the beaters will aid the turning action of the same in rotating the hog so as to present continually changing surface portions to the scrapers, while the excess of width of the frame over the length of the hog will permit a limited endwise motion of the latter which also aids in carrying the surface portions engaged by the beaters. Moreover, whenever the hog comes directly over one of the shafts, the projecting flanges 16 will engage the hog to lift the latter clear of the chains, in doing which the hog will be rotated both by the said flanges (which rotate with the shafts 11) and by the action of the beaters. Consequently, by employing these power-rotated projecting flanges as auxiliaries to the beaters, I am able to impart an unusual amount of movement, rotational and otherwise, to the hog while within the range of each set of beaters. However, since each hog can only move back and forth between the adjacent sets of spacer arms 8, I can positively control the rate at which the hog passes through the machine as a whole, as well as the amount of beating to which it is subjected during this passage, it being obvious that both can be effectively carried by simply varying the speed at which the shafts 3 and 11 are driven.

To remove the hairs and other particles loosened by the beaters and scrapers, I desirably provide a spray of water 17 issuing from a perforated pipe 18 into which it is pumped from a drain tank 19 by a power-driven pump 20. This tank is preferably mounted within the frame of the machine under a funnel 21 which catches all of the drippings and scrapings from the hogs and from which funnel the hair is removed by a screw conveyer 22, while the water drains through a screen 23 into the tank 19.

I claim as my invention:

1. A hog scraping machine including a scalding tank, a plurality of horizontal shafts disposed in substantially a common plane above the level of the liquid in the latter, scraping members carried by the respective shafts, and means independent of gravity for conveying a hog from the scalding tank and past all of the said shafts; the said means including inclined and parallel conveyer sections extending from below the level of the liquid in the tank to a second common plane parallel to the aforesaid plane but below the uppermost position reached by the said scraper members, and conveyer sections extending in the said second plane past all of the said shafts.

2. In a hog scraping machine, the combination with a rotating shaft, of flexible scraper elements carried thereby and projecting for some distance radially from the shaft, means for conveying a hog past the shaft and above the latter and with the lower surface portions of the hog disposed within the path transversed by the scraper members; and inflexible means upon the shaft projecting above the path in which the lowermost portions of the hog are moved, and thereby adapted to lift and rotate the hog while passing directly over the shaft.

3. Hog scraping mechanism as per claim 2, in which the last named means comprise collars rigid upon the shaft.

4. Hog scraping mechanism as per claim 2, in which the last named means comprise collars rigid upon the shaft and disposed at opposite sides of the scraper members and adjacent to the latter.

5. In a hog scraping machine, a plurality of parallel shafts disposed substantially in a common plane, a plurality of conveyer chains extending transversely of the said shafts above the latter, spaced fingers projecting upward from each of the chains for engaging a hog to cause the chain to positively move the hog, flexible scraper members mounted upon each shaft and projecting between transversely consecutive chains and presenting scraper portions above the top of the said chains, and inflexible hog-lifting elements carried by each shaft and interposed between the chains and the scraper members and projecting above the top of the said chains.

6. In a hog scraping machine, a plurality of consecutively disposed beater members, and continuously moving common means for supporting a hog and positively moving the same successively past the said members, the said means being arranged for permitting both rotation of the hog and a limited to and fro movement of the latter longitudinally of the direction in which it is being moved past the beater members.

7. In a hog scraping machine, a scalding trough, a plurality of scraping members all revolving in the same direction on horizontal shafts, hog supporting means extending upwardly from the trough and substantially horizontally past the beating members, movable spacer members separated by consecutive distances operatively exceeding the width of a hog and arranged for permitting only a limited back and forth movement of the hog between consecutive spacer members, and means for moving the said spacer members continuously in one direction past said scraping members.

8. In a hog scraping machine, a plurality of continuously rotating parallel shafts, means for moving a hog successively past said shafts and for freely supporting the hog during its said movement, and means carried by each shaft for beating the hog, raising the hog from its support, and rotating the hog while thus raised.

9. In a hog scraping machine, a plurality of parallel conveyer chains, means for simultaneously and continuously moving the chains in one direction, spaced fingers on the respective chains alined transversely of the said direction, and a plurality of scraper members disposed adjacent to said chains and arranged for successively engaging a hog resting on said chains and for dehairing the hog while the latter is being conveyed successively past the said scraper members.

10. In a hog scraping machine, a plurality of consecutively disposed rotating scraper members mounted respectively on separate shafts all substantially in a common plane, means for moving a hog successively past said scraper members and in a path disposed above the said shafts, and means for supporting the hog during its said movement, the said means being so disposed that each scraper member will lift the hog while the latter is passing the same; and auxiliary means upon the said shafts and coöperating with the said lifting of the hog for rotating the latter.

11. In a hog scraping machine, a plurality of continuously rotating parallel shafts, means for moving a hog successively above and past said shafts and for freely supporting the hog during its said movement, and separate means carried by each shaft for scraping the hog and rotating the hog upon its support.

12. In a hog scraping machine, a conveyer loosely supporting the hog and continuously moving in one direction, spacer means fast upon the conveyer for limiting the movement of the hog on the conveyer longitudinally of the latter, and a plurality of means all rotating in the same direction and disposed for engaging the hog while the latter is being conveyed past the same, the said plurality of means comprising members each composed of a rotating hog scraper and a hog-lifter coaxial therewith.

13. In a hog scraping machine, common means operating continuously and substantially in one plane for conveying the hog and for loosely supporting the hog while being conveyed, scraper means, and non-yielding spaced means independent of the scraper means for temporarily assisting the aforesaid means in the supporting of the hogs.

14. In a hog scraping machine a rotating shaft, a sleeve fast thereon, a flexible beater member carried by the sleeve and extending for a considerable distance radially from the shaft when the latter is rotating, and a collar carried by the sleeve adjacent to the beater member, the said collar being of less diameter than the said radial projection of the beater member, substantially as set forth.

15. In a hog scraping machine, a plurality of conveyer chains arranged for supporting and conveying the hogs, movable non-scraping elements projecting above the chains and arranged both for lifting and for rotating the hogs while passing said elements, and scrapers arranged for engaging the hogs independently of the said movable elements and while passing over the latter.

16. In a machine as per claim 11, guides adjacent to the chains and arranged for temporarily relieving the chains of the weight of the hogs during a portion of the conveying.

17. In a machine as per claim 11, guides adjacent to the chains and arranged for temporarily relieving the chains of the weight of the hogs during a portion of the conveying, and means projecting above said guides and operating independently of the scraper members for rotating the hogs.

Signed at Chicago, May 15th, 1917.

LOUIS A. KRAMER.